Sept. 11, 1945.  J. C. LANG  2,384,477

STAPLES AND THEIR MANUFACTURE

Filed Sept. 16, 1944  2 Sheets-Sheet 1

INVENTOR
Joseph C. Lang
BY Christy, Parmelee & Stickland
ATTORNEYS

Sept. 11, 1945. J. C. LANG 2,384,477
STAPLES AND THEIR MANUFACTURE
Filed Sept. 16, 1944 2 Sheets-Sheet 2
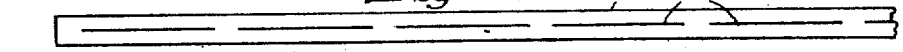
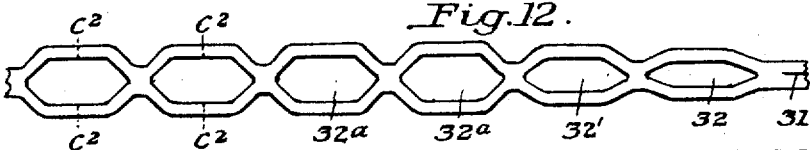
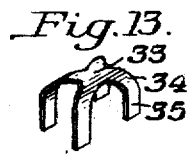
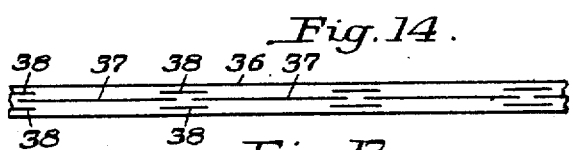
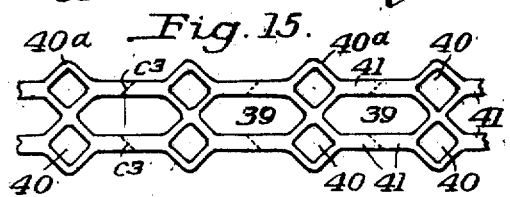
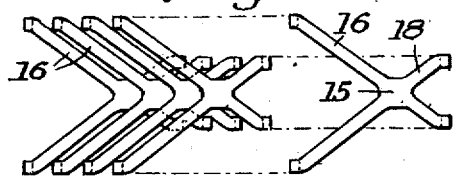
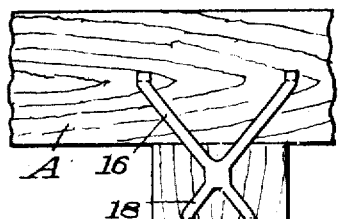
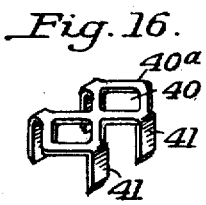
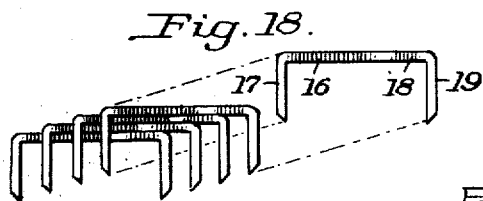
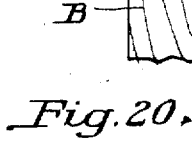
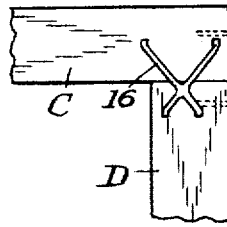
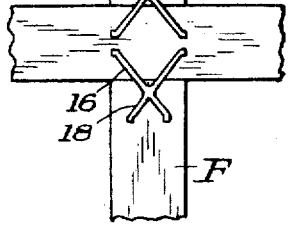
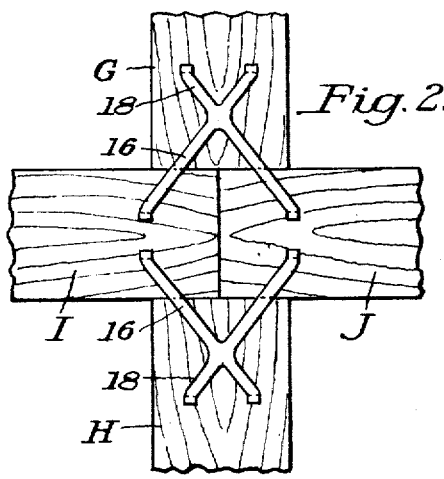
INVENTOR
Joseph C. Lang
By Christy, Parmelee, Strickland
ATTORNEYS Patented Sept. 11, 1945

2,384,477

UNITED STATES PATENT OFFICE 2,384,477

STAPLE AND ITS MANUFACTURE

Joseph C. Lang, Pittsburgh, Pa., assignor to Bocji Corporation, Pittsburgh, Pa., a corporation of Delaware Application September 16, 1944, Serial No. 554,349

17 Claims. (Cl. 59—77)

This invention pertains to multiple pointed fasteners of the type generally referred to in the art as staples, and to their manufacture, and is for a staple and a method of making a staple having more than two prongs or legs.

Conventional U-shaped staples having two legs may be satisfactorily employed in a great many places where the function of the staple is merely to bind papers together, or for securing wire, such as fencing wire, to posts. However, such two-pronged staples have not been found satisfactory for use in joining lumber or the making of wood frames or structures, particularly structures which have to be rigid. Moreover, such conventional two-pointed staples when used for the closing of boxes, do not, unless they are quite close together, or a great many of them are used, develop sufficient holding power.

According to the present invention, there is provided a staple and a method of making staples wherein the staple, instead of having two legs, has a number of legs more than two, each leg being formed at the end of an arm diverging from a central head or junction point. Staples of this type are capable of developing a considerably greater holding power than conventional staples, particularly where the legs diverge or radiate from a central head portion. They can be very effectively used for securing sections of lumber or like building material together and develop a much more effective holding power than nails or driven fasteners heretofore available. Because of the direction in which the various legs diverge, the fasteners are effective for holding the parts which are so joined from weaving or twisting. Also, staples much more effective for the closing of boxes by the method described in my copending application, Serial No. 538,578, filed June 3, 1944, or like methods, are provided by the present invention.

The invention further contemplates and provides a novel method of constructing multiple leg staples from metal in ribbon form by slitting and expanding. As such, it is an improvement on the invention disclosed in my copending application, Serial No. 498,627, filed August 14, 1943. Staples made by this method are characterized by the fact that in all of the several legs, the grain of the metal extends in a longitudinal direction, and hence is most effective for developing their necessary strength. Generally the method contemplates the slitting of a ribbon or strip of metal longitudinally at intervals, the expansion of such slit metal into a succession of loops, followed by the severing of the loops to form staple blanks, and thereafter, bending of several blanks to form staples.

My invention may be more fully understood by reference to the accompanying drawings, in which:

Fig. 11 is a view of the prepared blank for making a smaller staple;

Fig. 12 is a view showing the progressive expansion of the blank of Fig. 11 into a succession of loops;

Fig. 13 is a perspective view of another form of finished staple made from the blank of Fig. 12;

Fig. 14 is a plan view of another form of blank;

Fig. 15 is a plan view showing the blank of Fig. 14 expanded;

Fig. 16 is a perspective view of an individual staple made from the blank of Fig. 15;

Fig. 17 is a plan view of a nest of staples of the type shown in Fig. 8, the dotted lines indicating the extension of the row to any number of staples;

Fig. 18 is a perspective view of the arrangement shown in Fig. 17;

Figs. 19, 20, 21 and 22 are views showing typical ways of using the staple of Fig. 8; and Figs. 23, 24 and 25 are top, side, and end views of a staple similar to Fig. 16 but having an arched instead of a flat crown.

Figure 1:
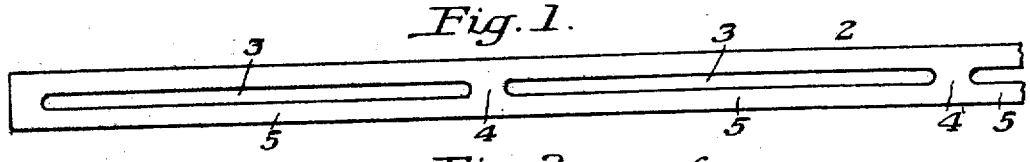
Fig. 1 is a plan view of the slitted blank from which the staples are developed.

Referring first to Figs. 1 to 5 inclusive, the staple is preferably formed from a ribbon or strip of metal designated generally as 2. The metal has been elongated by rolling in the direction of its length so that the general structure of the grain of the metal is longitudinally of the strip. The strip is punched or slitted at regular intervals to provide slits or, in the case of larger staples, slots 3. Thus the strip 2 has a succession of slots 3 connected by portions 4, and there are longitudinally extending bars of metal 5 at each side of the slot 3. The blank shown in Fig. 1 is then expanded by opening the slots 3 to form a succession of connected loops 6 shown in Fig. 2, these loops being joined by connecting portions 7 corresponding to the part 4 of the blank of Fig. 1. Each loop is of a generally elongated hexagonal shape with divergent end portions 8 and parallel side portions 9. The operation of expanding may be accomplished by any appropriate method, one successful method comprising the insertion of successively larger punch-like elements into the slots 3, which expand the metal to the form indicated.

The individual staples are then formed by cutting the side portions 9 of the loops at a point intermediate their length. For example, they may be cut on the lines marked c—c in Fig. 2. This then forms a substantially X-shaped blank with the parts 7 forming the center portion of the X and the portions 8 forming the divergent arms of the X, while the parts of the portions 9 which are attached to the ends of the divergent extensions 8 all extend in parallel directions. The extensions are thereafter bent to a plane perpendicular to their original portion, thereby forming the completed fastener shown in Figs. 3, 4 and 5. This fastener has a central part 10 from which radiate four divergent arms 11, and on the outer ends of these arms 11 are downwardly turned prongs 12. The central part 10 of the original staple is developed from part 4 of the blank shown in Fig. 1, or part 7 shown in Fig. 2. The arms 11 are developed from the parts 8 of the blank shown in Fig. 2, while the legs 12 constitute the portions of the sides 9 of the loop of Fig. 2.

Figure 3:
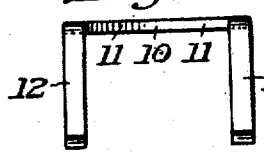
Fig. 3 is a side elevation of one of the individual staples or fasteners.
Figure 4:
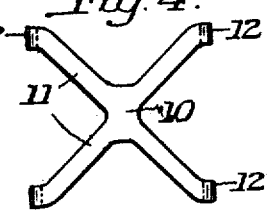
Fig. 4 is a top plan view of the fastener shown in Fig. 3.
Figure 5:
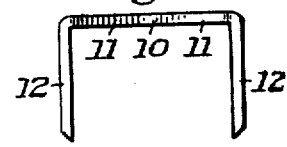
Fig. 5 is a view similar to Fig. 3, but at right angles thereto.

The staple shown in Figs. 3, 4 and 5 has arms which are all of equal length and equal spread.

Figure 8:
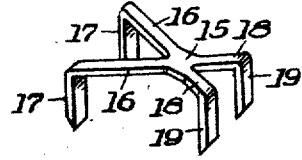
Fig. 8 is a perspective view of the finished staple.

For most operations a preferred form of staple is that shown in Fig. 8 in which two arms of the staple are shorter than the other two, while all of the downwardly turned legs are of the same length. In Fig. 8 the staple has a central portion 15 with two divergent arms 16 radiating therefrom at one side thereof, these arms having downwardly turned legs 17 at the free ends thereof. There are two other shorter arms 18 on the opposite side of the staple, these shorter arms having downwardly turned legs 19 which are of the same length as the legs 17. Thus two arms are longer than the other two, but the general X-shaped form of the staple is maintained. As will be hereinafter more fully described, this staple may be used in various ways for joining pieces of lumber or like nailable building material, and the difference between the length of the two sets of arms enables the staple to be used in a greater number of positions than where all of the arms are of the same length.

Figure 6:
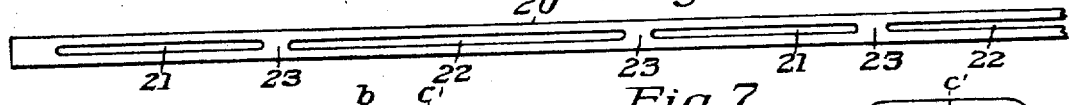
Fig. 6 is a view similar to Fig. 1 of the blank for making a preferred form of staple.
Figure 7:
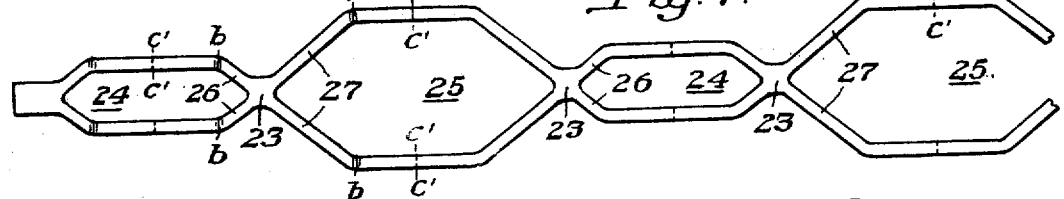
Fig. 7 is a view of the blank of Fig. 6 after it has been expanded.

The staple shown in Fig. 8 is developed from strip metal the same as the staple shown in Figs. 3, 4 and 5, and the development of the staple is illustrated in Figs. 6 and 7 wherein 20 designates the original strip of metal. There are alternate short and long slots or slits 21 and 22 respectively formed therein, these slots being separated by portions 25 which are not slitted. The strip is then expanded to form a succession of loops 24 and 25, loops 24 being alternated between the loops 25 and being of very nearly the same length as the loops 25, but being of less width. The staples are formed by cutting the expanded strip across the side portions of the loops on the lines c'—c'. The leg portions are then bent down, the point of bending being indicated by the shaded portions b in Fig. 7. Portion 15 of the completed staple corresponds to portion 23 of the original blank, and portions 26 form the short arms 18, while portions 27 form the long arms 16. Parts of the side bars of the loops 24 form the legs at the ends of the arms 18, and parts of the side bars of the loops 25 form the legs 17.

Figure 9:
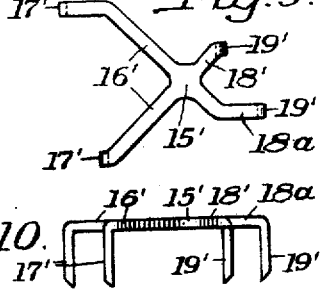
Figs. 9 and 10 are plan and side elevations respectively of a form of staple slightly modified from that shown in Fig. 8.
Figure 10:
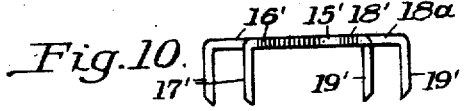

In Figs. 9 and 10 there is illustrated a modification of the staple shown in Fig. 8 in which each arm is of a different length. This result can be obtained by using the expanded blank of Fig. 7, but changing the places at which the blanks are cut and changing the place where the bend to form the legs is made. In Figs. 9 and 10, 15' designates the center portion of the staple, 18' and 18a designate the short arms which, however, are of different length from each other, and 19' designates the downwardly turned legs, these legs, however, being of equal length. There are two longer arms 16' which also are of unequal length, and they have downwardly turned legs 17' which are equal to each other and to the legs 19'. This staple is designed for use in special cases where it is desired to avoid having any two legs of the staple penetrate the same grain of the piece of wood. By having each arm of the staple of a different length and properly positioning the staple, no two legs will be in line in the same grain of a piece of wood, and hence the tendency toward splitting which might otherwise occur, particularly with certain woods and certain constructions, is avoided.

Figure 2:
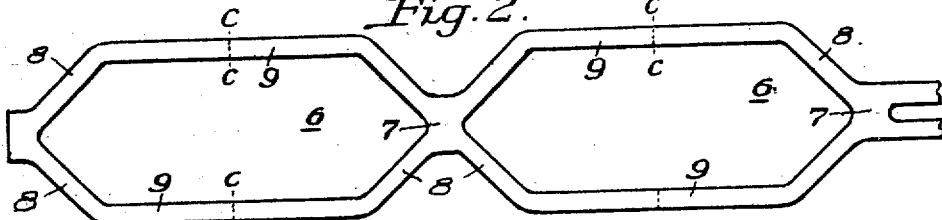
Fig. 2 is a plan view of the expanded blank.

Referring to Figs. 11, 12 and 13, the blank development is much the same as that described in connection with Figs. 1 and 2, but the shape of the finished staple is quite different. In Fig. 11, 30 designates a strip of metal with the grain running longitudinally. In this instance it is illustrated as being provided with a series of regularly spaced slits 31 of uniform length. It will be noted that in 31 the metal is merely slit as distinguished from an open slot being formed, and as hereinbefore indicated, either a slit or slot may be employed, preferably, however, with larger staples and heavier metal, the open slot being used. However the term "slit" will be hereinafter adopted as a generic term to cover the severing of the metal, either by cutting without removing metal, or by cutting to actually form an open slot. The blank as prepared in Fig. 11 is then expanded as shown in Fig. 12, which indicates the progressive manner in which the connected loops are developed. At the extreme right-hand end of Fig. 12 the metal is in its original state, whereas in the position next to the right-hand end the blank has been opened out part way to form a loop 32. At 32' the loop has been further expanded, and at 32a the expansion has been completed and there is shown several of the completed loops 32a. These loops are severed as indicated in Fig. 12 on the lines c²—c², forming X-shaped blanks. Instead of the blanks being bent as hereinbefore described, the central connecting part of the blank is arched, forming a staple with a rounded crown and four downwardly extending legs. This staple is useful for example, in application to the corner of cartons by a method as disclosed in my aforesaid application, Serial No. 538,578.

As shown in Fig. 13 the staple has a central portion 33 which is arched or curved transversely in one direction with downwardly and outwardly sloping projections 34 formed by the diagonal portions of the loop, and extending downwardly from portions 34 are the legs 35 which are produced from the side portions of the loops of the blank.

This staple is desirable for use in closing cartons and the like, particularly where it is set astraddle of the corner of the carton, because the enlarged bridge portion 33 is less likely to cut or tear through the paper of the carton, and because it has a better holding effect than two adjacent staples would have. Moreover, it is more effective to prevent weaving of the joined walls of the carton than conventional two-pronged staples.

In the modification shown in Fig. 14, the blank designated generally as 36 comprises a ribbon of metal similar to the blank metal previously described. It is slit at regular intervals along its longitudinal center as indicated at 37. At 38 it is provided with pairs of short slits which are staggered with reference to the slits 37 and which are spaced outwardly from the center line of the strip. This strip is opened out or expanded by spreading the central slits 37 into loops 39 shown in Fig. 15 and the slits 38 are spread out into loops 40. The expanded blank shown in Fig. 15 may then be severed on the dotted lines designated c³ so that each blank has two of the small loops 40 side by side and four projections 41. These projections are bent perpendicular to the original plane of the metal as shown in Fig. 16, forming a U-shaped staple having a bridge portion comprised of the two expanded loops 40 and having four legs 41. This staple is effective for holding paper or other thin material on a support, because the portions 40 constituting the bridge of the staple have a large over-all area to prevent tearing or cutting through the paper. It will be noted that in this form of staple, the X-like form is maintained with the addition of parts 40a to complete the forming of the small loops 40.

This staple may also desirably be made in an arched form as shown in Figs. 23, 24 and 25 with the part forming the two loops 40 being arched as indicated at 40b. The turned down legs, at the corners of the loops 40, are, of course at the outer end of the X-shaped formation, which with parts 40a form the small loops.

In all of the various forms of staples which have been hereinbefore described, the staple is developed from a narrow ribbon of metal by slitting and expanding. The grain of the metal which runs longitudinally in the original ribbon extends in a longitudinal direction in the arms and legs of the finished staple, and the bending of the metal to form the prongs or legs is across the length of the grains or fibers of the original metal. While staples of a similar shape might be formed by blanking them out of flat sheet metal, such blanking out process would result in the wasting of a large amount of metal and the formation of an excessive quantity of scrap, and moreover the finished staple would not have the same desirable distribution of the grain.

It has heretofore been pointed out that the form of staple shown in Fig. 8 is a present preferred form for all general purposes such as the joining together of pieces of wood. Another reason why this form of staple is preferred to the form shown in Fig. 1 is that the staples shown in Fig. 8 may be arranged in a compact strip with the narrow end of one staple nesting into the wide end of an adjacent one. Such staples may be then separated as indicated in Figs. 17 and 18 by breaking off or slipping away that staple which is at the end of the row, moving it preferably with the large end first. Hence a considerable number of staples may be arranged in an orderly fashion in a small space, such as the dispensing magazine of a driving tool, whereas staples having the legs all of equal length cannot be so arranged or nested, or if so arranged and nested, the various legs would interlock in a way to prevent separation thereof.

In Figs. 19, 20, 21 and 22, I have shown various ways of using the staple of Fig. 8 in the construction of wooden structures, such as the frames of housings, the construction of door and window frames, the building of furniture, etc. In Fig. 19 two pieces which form a generally T-shaped structure are illustrated, the long legs of the staple being driven into the cross bar of the T and the short legs being driven into the upright or stem.

In the preferred way of using these staples, they will be simultaneously applied to opposite sides of the structure so that the driving pressure on the two sides of the structure at the time the fasteners are being set will be equalized. This, however, is not essential. It will be seen that the fasteners in such an assembly develop a greater holding power with less tendency to split the wood than nails entered through the cross piece longitudinally into the stem or driven at an angle from the stem into the cross piece. The X-shaped staples provide in effect two intersecting diagonal tension elements between the cross piece and the stem so that relative tilting movement in either direction puts the metal in tension and of course under direct pull the metal is in direct tension, and any twisting forces between two parts so joined would require the twisting of the fastener out of its original plane, and if there is a fastener on each side of the structure, the two fasteners very effectively resist any such twisting movement. In Fig. 19, A indicates the cross bar and B is the stem. In Fig. 20 the fastener is shown joining two abutting pieces of material designated C and D, the joint being much the same as that shown in Fig. 19. Fig. 21 shows the application of the fastener to two pieces E and F which cross each other, and which are mortised or notched at the area of intersection, there being two staples shown in this instance. In Fig. 22 the juncture of four pieces of wood is indicated, these being designated G, H, I and J. The two fasteners positioned as shown in this diagram serve to effectively join all of the parts. By suitably beveling or otherwise shaping the points of the staples, they can exert a pressure tending to pull the parts together, as the staple is being driven, as will be well understood by those skilled in the art.

It may be noted that in the several forms of X-shaped staples herein illustrated, all downwardly turned legs are bent down about parallel axes, which axes are also transverse to one center line of the staple and parallel to the other center line. In other words, corresponding surfaces of the legs are all in parallel planes. This is a desirable feature in providing for the feeding of the staples and guiding the legs in a staple driver and in developing the maximum holding power under most conditions in which the staple is used.

Also, by forming the staples in the manner described, the grain of the original metal is most advantageously disposed to develop strength. In the crown or top part of the staple, at the very center, the original grain of the metal is unchanged. In each of the four arms, these arms forming the rest of the crown, the grain is lengthwise of the arms, but at various angles to the original axis of the strip. In the legs, the grain is lengthwise, and the bands between the legs and arms are crosswise of the grain. This could not be the case in a staple stamped from sheet metal, even though it had the same form.

While I have illustrated and described certain specific embodiments of my invention, and specific ways of using the several forms of staples, it will be understood that this is merely by way of illustration, and that various changes and modifications are within the contemplation of my invention and under the scope of the following claims.

I claim:

1. A staple formed of strip metal and having a central body portion and more than two legs extending in divergent directions from the body portion, the body portion and arms being in a plane, and a leg portion at the free end of each arm, which leg is perpendicular to the plane of the body portion and arms, all of the legs having their corresponding surfaces in parallel planes.

2. A staple formed of strip metal having a crown of generally X-shaped form and having a leg at the free end of each arm of the X perpendicular to the plane of the X, all of the legs having their corresponding surfaces in parallel planes, the lines of juncture between the several legs and the crown all being parallel.

3. A staple of generally X-form having an integral leg at the free end of each arm of the X, said staple being formed of expanded strip metal with any predominant grain structure in the arms and legs running lengthwise thereof, and with the legs having their corresponding faces in parallel planes.

4. A substantially X-shaped staple having four arms which intersect and are joined together at their point of intersection, two of the arms being longer and diverging further than the other two, each arm having a leg portion at the outer end thereof and perpendicular thereto, all of the legs having their corresponding surfaces in parallel planes.

5. A substantially X-shaped staple having four arms which intersect and are joined together at their point of intersection, said arms being in a plane, all of said arms being of unequal length with two diagonally opposite arms having a total length greater than the total length of the other two diagonally opposite arms, each arm having a leg portion at the outer end thereof perpendicular thereto, the lines of juncture between all of the legs and arms being parallel.

6. An expanded strip metal staple of generally X form having four intersecting arms which are in a plane, the arms having perpendicular leg portions at their outer ends, two of said arms on one side of the transverse center of the staple being longer than the other two arms to facilitate nesting and separation of the staples.

7. The method of making staples which comprises slitting a strip of metal at intervals longitudinally of its length, expanding the slit portions to form a succession of loops and then cutting the strip transversely of its length across two successive loops to provide a generally X-shaped blank, and bending the blank to provide a crown and legs, with the sides of the loop constituting the legs.

8. The method of forming a staple which comprises slitting a strip of metal at intervals longitudinally of its length, expanding the slits in the plane of the metal into a succession of elongated loops and cutting the loops intermediate the ends of the loops transversely of the length of the strip to form separate flat individual staple blanks, the sides of the loops being parallel with each other and with the longitudinal edges of the original strip metal.

9. The method of forming staples which comprises slitting a strip of metal at intervals along its length, expanding the slit portions to form a succession of connected loops, alternate loops being expanded wider transversely of the axes of the strip than the intervening loops, then severing the strip across the length of adjoining loops to provide a blank having four arms with parallel extensions thereon and two of the arms being less widely separated than the other two, and thereafter bending the extensions of the ends of said arms to form legs.

10. The method of forming staples which comprises slitting a strip of metal at regular intervals longitudinally along its center line, longitudinally slitting the strip for relatively shorter distances at each side of the center line and in staggered relation to the first slits, thereafter expanding the first formed slits to form a series of connected relatively long loops and expanding the second slits to form relatively small expanded head portions, severing the said first loops across the width of the strip to form individual blanks in which the sides of the loops constitute leg forming portions, and bending such leg forming portions to provide a staple with a crown and legs.

11. The method of forming staples which comprises slitting a strip of metal longitudinally at spaced intervals, expanding the slits to form a succession of connected loops, cutting the strip transversely across each loop to provide separate X-shaped blanks, and then bending the arms of the X-shaped blanks about parallel axes to staple form.

12. The method of forming staples which comprises slitting a strip of metal longitudinally at spaced intervals, expanding the slits to form a succession of connected loops, cutting the strip transversely across each loop to provide separate X-shaped blanks, and then bending said blanks to staple form, alternate loops being of a size different from the other loops to form non-symmetrical blanks.

13. A staple having a crown comprised of two connected expanded metal loops arranged corner to corner, and legs extending downwardly from the two opposite corners of each loop, one each of the connected loops and two of the legs being on each side of the transverse center line of the blank.

14. The method of forming fasteners having a head forming portion and leg forming portions from narrow strip metal which comprises slitting a strip of metal at intervals, expanding the metal transversely of the slits to form a succession of connected loops in a single row with side portions of the loops being parallel and forming parallel side edges of the strip, and severing the strip across said loops whereby portions of the loops constitute leg forming portions of the fastener.

15. The method of forming fasteners having a head portion and a leg portion from strip metal which comprises slitting a strip of metal at intervals, expanding the metal transversely of the slits to form a succession of loops, and severing the strip across said loops whereby portions of the loops constitute leg portions of the fasteners, and bending a portion of the loops which have been so severed about parallel axes perpendicularly to the original plane of the metal to form legs.

16. The method of forming staples from strip metal which comprises slitting the strip at intervals according to a regular pattern, expanding the metal transversely of the length of the slits to provide a single row of connected blanks, and severing the metal at regular intervals to form individual like fastener blanks in which a slit and expanded portion of the strip constitute at least a part of each blank.

17. As a new article of manufacture, a single row of connected staple blanks comprising a ribbon of metal slit and expanded into a connected single row of loops with opposite sides of the loops being parallel and extending in the direction of the longitudinal axis of the strip, which loops may be severed transversely to form individual staple blanks formed of expanded metal with parallel legs.

JOSEPH C. LANG.

---

CERTIFICATE OF CORRECTION.

Patent No. 2,384,477.　　　　　　　　　　　　September 11, 1945.

JOSEPH C. LANG.

It is hereby certified that error appears in the printed specification of the above numbered patent requiring correction as follows: Page 1, second column, line 2, for "several" read --severed--; page 4, second column, line 12, claim 9, for "axes" read --axis--; and that the said Letters Patent should be read with this correction therein that the same may conform to the record of the case in the Patent Office.

Signed and sealed this 4th day of December, A. D. 1945.

(Seal)

Leslie Frazer
First Assistant Commissioner of Patents.

been so severed about parallel axes perpendicularly to the original plane of the metal to form legs.

16. The method of forming staples from strip metal which comprises slitting the strip at intervals according to a regular pattern, expanding the metal transversely of the length of the slits to provide a single row of connected blanks, and severing the metal at regular intervals to form individual like fastener blanks in which a slit and expanded portion of the strip constitute at least a part of each blank.

17. As a new article of manufacture, a single row of connected staple blanks comprising a ribbon of metal slit and expanded into a connected single row of loops with opposite sides of the loops being parallel and extending in the direction of the longitudinal axis of the strip, which loops may be severed transversely to form individual staple blanks formed of expanded metal with parallel legs.

JOSEPH C. LANG.

CERTIFICATE OF CORRECTION.

Patent No. 2,384,477.

September 11, 1945.

JOSEPH C. LANG.

It is hereby certified that error appears in the printed specification of the above numbered patent requiring correction as follows: Page 1, second column, line 2, for "several" read --severed--; page 4, second column, line 12, claim 9, for "axes" read --axis--; and that the said Letters Patent should be read with this correction therein that the same may conform to the record of the case in the Patent Office.

Signed and sealed this 4th day of December, A. D. 1945.

(Seal)

Leslie Frazer
First Assistant Commissioner of Patents.